Feb. 6, 1951     W. W. MUMFORD     2,540,488
MICROWAVE FILTER
Filed April 30, 1948                  3 Sheets-Sheet 1

INVENTOR
W. W. MUMFORD
BY
Ralph T. Holcomb
ATTORNEY

Feb. 6, 1951 W. W. MUMFORD 2,540,488
MICROWAVE FILTER

Filed April 30, 1948 3 Sheets-Sheet 3

INVENTOR
W. W. MUMFORD
BY
Ralph T. Holcomb
ATTORNEY

Patented Feb. 6, 1951

2,540,488

UNITED STATES PATENT OFFICE 2,540,488

MICROWAVE FILTER

William W. Mumford, Atlantic Highlands, N. J., assignor to Bell Telephone Laboratories, Incorporated, New York, N. Y., a corporation of New York Application April 30, 1948, Serial No. 24,257

24 Claims. (Cl. 178—44)

This invention relates to frequency selective networks and more particularly to microwave filters for use in wave guides.

The principal object of the invention is to improve the transmission characteristics of microwave filters. A more specific object is to equalize the insertion loss and minimize the reflection coefficient of such a filter over a wide band.

In many applications it is desirable to have a microwave filter with a substantially constant insertion loss and a reflection coefficient which is substantially zero over as wide a band of frequencies as possible. A filter with such a characteristic is herein called a maximally-flat filter. This type of characteristic is of particular importance, for example, in microwave television repeaters, where the filter may be located some distance from the receiving antenna and reflections at the filter input will cause disturbing echoes.

In the microwave filter in accordance with the present invention the insertion loss can be made constant and the reflection coefficient can be made substantially zero over as wide a band as desired by using a sufficient number of component elements. The filter comprises a plurality of resonant chambers connected in tandem by interposed sections of wave guide. In the embodiment shown each chamber is formed by a pair of substantially equal susceptive admittances positioned within a wave guide and so spaced from each other as to define a chamber which is resonant at the mid-band frequency of the band to be passed. This spacing is approximately a half wavelength at the mid-band frequency. The admittances may, for example, be apertured transverse partitions, or irises, or posts extending all or part of the way across the guide. It is sometimes convenient to provide means for adjusting the resonant frequency of the chamber. A tuning plug, inserted through a wall of the guide at a point intermediate the pair of admittances, may, for example, be used for this purpose. Adjacent chambers are connected by a section of wave guide having a length approximately equal to the average spacing of the two pairs of admittances forming the adjacent chambers, decreased by a quarter wavelength and increased by an integral number, which may be zero, of half wavelengths in the guide at the mid-band frequency. These connecting sections are, therefore, approximately equal in length to an odd multiple, including unity, of quarter wavelengths at the resonant frequency.

For a maximally-flat filter in accordance with the invention, when the number of resonant chambers exceeds two the respective band widths passed by the chambers increase progressively from the center to both ends of the filter. This tapering of the pass bands is preferably accomplished by controlling the susceptances of the respective pairs of admittances. When irises are employed as the admittance elements, the susceptance may be controlled by the size of the iris opening. When inductive posts are used, the susceptance depends upon the cross-sectional area and the position with respect to the longitudinal center line of the guide. For example, the posts may all have the same diameter with the respective pairs progressively displaced transversely as the ends of the filter are approached from the center.

The nature of the invention will be more fully understood from the following detailed description and by reference to the accompanying drawing in which like reference characters are used to designate similar or corresponding parts and in which.

Figure 1:
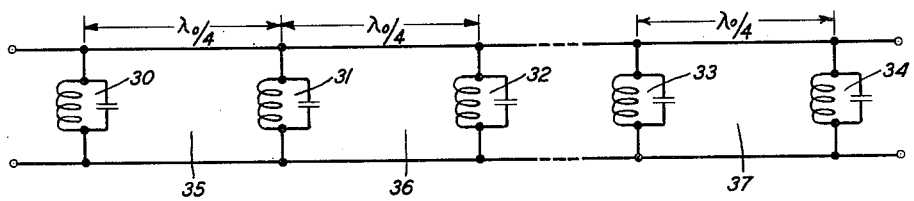
Figs. 1, 2 and 3 are schematic filter diagrams to be referred to in developing the design procedure for filters of the invention.

A filter generically of the type referred to above as a maximally-flat filter is disclosed in United States Patent No. 1,849,656 issued March 15, 1932, to W. R. Bennett. It is shown in the patent how to proportion the series and shunt branches from section to section to form a tapered line structure such as to give the filter as a whole a smooth transmission characteristic over the pass band, free from irregularities due to undamped resonances. In such a filter the bandwidth of the selective branches decreases from section to section from each end of the filter to the middle, the value of the series and shunt reactances, respectively inverse to each other, being proportional to the quantity $$\sin \frac{2r-1}{2n}\pi \qquad (1)$$

where $r$ denotes the order of a branch (series or shunt) counting from one end and $n$ is the total number of branches.

In attempting to construct a wave guide filter having its reactances proportioned to provide a maximally-flat transmission characteristic in accordance with general design principles taught by the Bennett patent, certain new factors come in which raise difficulties. One of these has to do with mutual impedance between the successive branches and another has to do with the excess phase shift possessed by resonant cavities where these are used as the filter reactances.

At ordinary wire transmission frequencies where coils and condensers are used, the mutual impedance between filter elements can be made small enough to be ignored. At wave guide frequencies, however, it is difficult or impossible to isolate the filter branches without introducing other effects which must be taken into account. In particular it is quite difficult to lump all of the desired filter branches at one place in a wave guide without encountering the complicated effects of mutual impedances, and if the filter branches are separated by lengths of guide sufficient to reduce the mutual impedances to a negligibly small value these separating lengths of guide act as filter elements and must be accommodated in the over-all design. Where the frequency selectivity introduced by the length of line inserted between the filter branches is sufficient to require compensation, this may be done by broadening by an equivalent amount the selectivities of the adjacent filter branches.

Resonant cavities, while similar in behavior to lumped tuned circuits in possessing frequency selective transmission properties and phase shift, differ in having an excess phase shift which can be represented as a short length of transmission line added to the analogous tuned circuit. In the practical design of a wave guide filter this must be taken into account in specifying the length of guide to be included between successive cavities of the filter.

In a wave guide filter of the maximally-flat type made up of resonant cavities built into the line and separated from one another by isolating lengths of guide, it is seen, therefore, that not only must the cavities have bandwidths tapered in accordance with the rule given in Bennett's patent, but other critical dimensions are (1) corrected value of bandwith of cavities to compensate the filter effects introduced by the isolating lengths of guide, and (2) corrected length of separating line sections to compensate excess phase shift of the resonant cavities.

In order to provide the inverse series and shunt reactances required for the filter, advantage is taken, according to this invention, of the quarter wavelength line as an impedance transformer to supply the series reactances from the physically included shunt reactances in the line. This permits constructing a wave guide filter, for example, comprised of resonant cavities behaving as shunt resonant circuits, separated a quarter wavelength (or odd multiple thereof) apart along the guide and having bandwidths tapered from section to section from each end of the filter to the middle, as specified above. The quarter wavelength separating sections give the effect, in such case, of transforming alternate shunt-resonant circuits in shunt to series-resonant circuits in series in the line. Conversely, if the shunt reactances are series-resonant, the transformed reactances effectively in series in the line are parallel-resonant.

Figure 2:
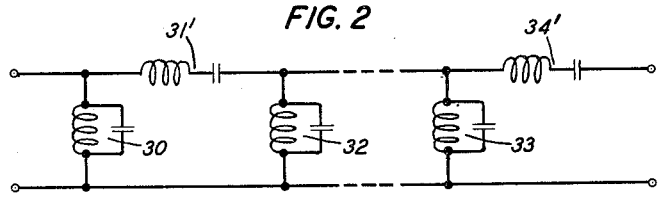

This process is illustrated in the equivalent filter circuits of Figs. 1 and 2. Fig. 1 shows five parallel-resonant shunt impedance branches 30 to 34 connected by the quarter-wave sections of line 35, 36 and 37. The broken lines indicate that some shunt branches, here assumed to be an even number, have been omitted. The equivalent ladder-type filter circuit of Fig. 2 comprises parallel-resonant shunt branches and series-resonant series branches. Starting at the left end of the circuit of Fig. 2 there is first encountered the shunt branch 30, which is identical with the branch 30 of Fig. 1. Due to the impedance transforming property of the quarter-wave section 35, the parallel-resonant shunt branch 31 of Fig. 1 appears in Fig. 2 as the series-resonant series branch 31'. The branch 32 in Fig. 1 undergoes a double impedance transformation due to the two quarter-wave sections 35 and 36 and therefore appears in Fig. 2 in its original form as a parallel-resonant shunt branch. In like manner the shunt branch 33 of Fig. 1 appears unchanged in Fig. 2 but the branch 34 becomes the series-resonant series branch 34' in Fig. 2.

If it is found that a quarter wavelength separation is insufficient to reduce the mutual impedance between adjacent filter branches by the desired amount, a longer length of line equal to an odd multiple of a quarter wavelength may be used. This, of course, accentuates the frequency sensitivity of the connecting line, which, as stated, may need to be taken into account (by decreasing the selectivities of the filter branches by appropriate amounts) particularly in broad band filters.

*Compensation for line selectivity*

Figure 3:
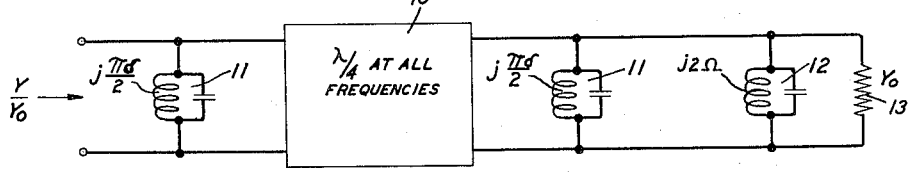

Reference is made to a particular case as represented in Fig. 3 where an ideally inverting line 10 is provided at each end with a tuned circuit 11, 11 of the proper dimensions for compensating line selectivity over a transmission band. The admittance of each branch 11 is $$j\frac{\pi\delta}{2}$$

and it remains to determine the selectivity of each circuit 11 under the following specified conditions:

The circuit at the far end of the quarter wavelength transforming line section is shown as consisting of a parallel-resonant circuit 12 and a terminating impedance 13 of admittance, $Y_0$.

The terminating admittance of the single shunt branch 12 together with its terminating impedance 13 is given by:

Terminating admittance $= Y_0(1+j2\Omega)$  (2)

where $\Omega$ is a frequency parameter defined as $$\Omega = \frac{\frac{f}{f_0}-\frac{f_0}{f}}{\frac{f_c}{f_0}-\frac{f_0}{f_c}} \quad (3)$$

$f_0$ being the mid-, or resonant, frequency, and $f_c$ being the cut-off frequency.

The input admittance at the left-hand end of the line is $$\frac{Y}{Y_0} = \frac{(1+j2\Omega)\cos\theta + j\sin\theta}{\cos\theta + j(1+j2\Omega)\sin\theta} \quad (4)$$

where $$\theta = \frac{2\pi l}{\lambda}$$

$l$ is nominally a line a quarter wavelength long and $\lambda$ is the wavelength.

If $$\theta = \frac{\pi}{2}(1+\delta) = \frac{\pi}{2} + \frac{\pi\delta}{2}$$
$$\cos\theta = -\sin\frac{\pi\delta}{2} \doteq -\frac{\pi\delta}{2}$$  (4a)

and $$\sin\theta = \cos\frac{\pi\delta}{2} \doteq 1$$

where $\delta$ is a small number compared to 1.

$$\frac{Y}{Y_0} \doteq j\frac{\pi\delta}{2} + \frac{1}{1+j\left(2\Omega + \frac{\pi\delta}{2}\right)}$$  (5)

From Equation 4a setting $$\frac{2\pi l}{\lambda_0} = \frac{\pi}{2}$$

it follows that $$\delta = \pm\left(\frac{f}{f_0} - 1\right) \doteq \left(\frac{f}{f_0} - \frac{f_0}{f}\right)\left(\frac{1}{2}\right)$$  (6)

Since the terminating admittance of a single shunt resonant branch may be expressed in terms of its selectivity as equal to $$j2Q\left(\frac{f}{f_0} - \frac{f_0}{f}\right)$$  (7)

the admittance $$j\frac{\pi\delta}{2} = j2Q\left(\frac{f}{f_0} - \frac{f_0}{f}\right)$$  (8)

or substituting for $\delta$ from Equation 6 and solving for the selectivity, $$Q = \frac{\pi}{8}$$  (9)

The selectivity of a quarter wavelength connecting line may thus be compensated by changing the selectivities of the filter branches connected to it by $$\frac{\pi}{8}$$

If the connecting line is three-fourths wavelength long, the correction to be applied is $$\frac{3\pi}{8}$$

For a filter comprising more than two resonant chambers connected in tandem by sections of wave guide, the general rule is that the selectivity of each end chamber is decreased by $$\frac{\pi}{8}$$

and the selectivity of each intermediate chamber is decreased by $$\frac{\pi}{8}$$

for every quarter wavelength of length of the connecting sections, to compensate for the selectivity of the sections.

*Compensation for excess phase shift of resonant cavities*

Figure 4:
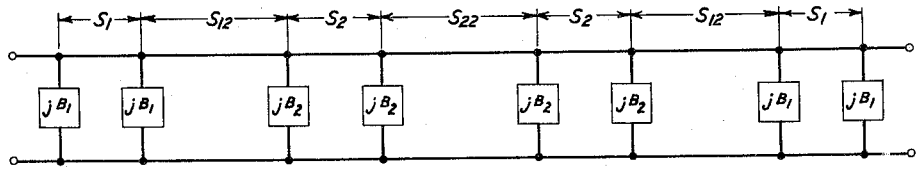
Fig. 4 is a block schematic diagram of the arrangement of elements of a filter according to the invention.

Referring now to Fig. 4, a four-branch filter is represented, comprising four resonant cavities, the end ones of which are each formed by a pair of obstacles $jB_1$, separated a distance $S_1$ from each other. The other or middle cavities are each formed by a pair of obstacles $jB_2$ separated a distance $S_2$ from each other. Each cavity is separated from the next by a length of line, the section $S_{12}$ separating each of the end cavities from the next and $S_{22}$ separating the two middle cavities.

Considering each cavity by itself, the obstacles at each end are assumed to be equal and to have a susceptance, $BY_0$, where $Y_0$ is the surge admittance of the connecting transmission line. This type of cavity is resonant when the relation is satisfied:

$$\tan\frac{2\pi l}{\lambda_0} = \frac{2}{B}$$  (10)

where $\lambda_0$ is the resonant wavelength in the transmission line, $l$ is the length of the cavity (in Fig. 4, $S_1$ or $S_2$) and $B$ is the normalized susceptance of the end obstacles.

This resonance occurs at any one of a number of wavelengths at which the above relation is satisfied, but the first and second longest wavelengths at which resonance occurs are in the region which is usually of greatest interest.

The selectivity in this region is determined also by the value of the susceptance, $BY_0$, of the obstacles, and is given by the relation:

$$Q_\ell = \frac{\arctan\frac{2}{B}}{\arctan\left(\frac{4\sqrt{B^4+4B^2-4}}{B^4+4B^2-8}\right)}$$  (11)

This selectivity is based upon the wavelength, not the frequency parameter. In terms of the wavelength in the transmission line this is $$Q_\ell = \frac{\frac{2\pi l}{\lambda_{g0}}}{\frac{2\pi l}{\lambda_{gc1}} - \frac{2\pi l}{\lambda_{gc2}}}$$  (12)

where $\lambda_{g0}$ is the wavelength of resonance in the wave guide and $\lambda_{gc1}$ and $\lambda_{gc2}$ are the wavelengths at the half power loss points. (For narrow percentage bands, the percentage bandwidth is greater in terms of wavelength than in terms of frequency by the square of the ratio of the wavelengths in the guide and in free space.)

Figure 6:
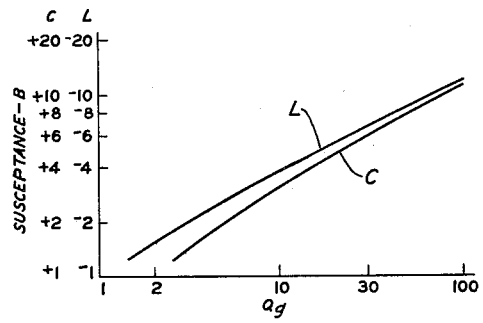
Figure 12:
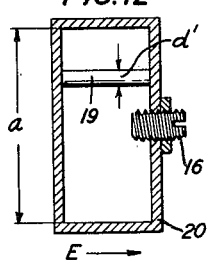
Fig. 12 shows a cross-section of the filter of Fig. 11 taken at the section line 12—12.
Figure 13:
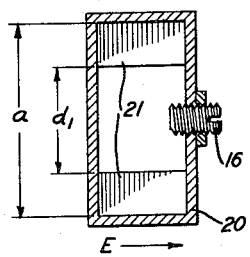
Fig. 13 shows a cross-section of the filter of Fig. 10 taken at the section line 13—13.
Figure 14:
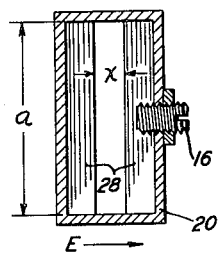
Fig. 14 is a cross-sectional view of a modification of the filter of Fig. 10, using capacitive irises.

Fig. 6 gives two plots of this relation between selectivity and susceptance, the curve L being for an inductive obstacle of the type shown in Figs. 12 and 13 and the curve C being for a capacitive obstacle of the type shown in Fig. 14. From the ordinate scales in Fig. 6 it is seen that the susceptance $B$ is negative for an inductive obstacle and positive for a capacitive obstacle.

The excess phase shift referred to above is taken care of by first representing it as a short length, $l'$, of transmission line and then absorbing this into the connecting line between cavities. This excess length of line, $l'$, is found from the relation $$\tan\frac{4\pi l'}{\lambda_0} = -\frac{2}{B}$$  (13)

Combining this with Equation 10 and solving for $l'$ gives $$l'=\frac{\lambda}{4}-\frac{l}{2} \quad (14)$$

where $l$ is the length of the cavity (between its obstacles). The length of connecting line is a quarter wavelength, or some odd multiple of a quarter wavelength, corrected at one end by absorbing a length $l'_2$ for the cavity located at that end, and by a length $l_2'$ for the cavity located at the opposite end. Thus, the corrected length $l_c$ of the connecting line is given by $$l_c=(2m+1)\frac{\lambda}{4}-l'_1-l'_2$$

$$=(2m+1)\frac{\lambda}{4}-\frac{\lambda}{4}+\frac{l_1}{2}-\frac{\lambda}{4}+\frac{l_2}{2}$$

$$=\frac{l_1+l_2}{2}+(2m-1)\frac{\lambda}{4}$$

$$=\frac{l_1+l_2}{2}-\frac{\lambda}{4}+\frac{m\lambda}{2} \quad (15)$$

where $l_1$ is the length of one cavity and $l_2$ is the length of the other cavity, and $m$ is any integer, including zero.

This important relationship expressed in words means that the length of the connecting line between two resonant cavities is equal to the average length of the two cavities, minus a quarter wavelength, to which may be added a half wavelength or some multiple of a half wavelength.

It is seen from Equation 13 that the sign of $l'$ can be plus or minus depending on whether the susceptance B of the obstacle is negative or positive. Where the obstacles are inductive, B is negative and where they are capacitive, B is positive. In the inductive case the excess phase is positive and when this is absorbed into the connecting line the length of the latter is slightly less than a quarter wavelength or odd multiple thereof. In the capacitive case the excess phase shift is negative and the connecting line must be made slightly greater than a quarter wavelength or odd multiple thereof.

*Wave guide filter structure and design*

Consideration will first be given to types of wave guide obstacles that may be used in constructing a filter, three of these types being shown in Figs. 12, 13 and 14.

Figure 7:
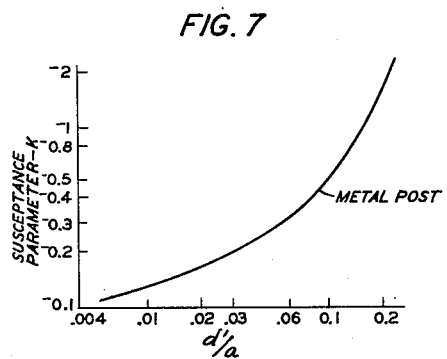
Figure 8:
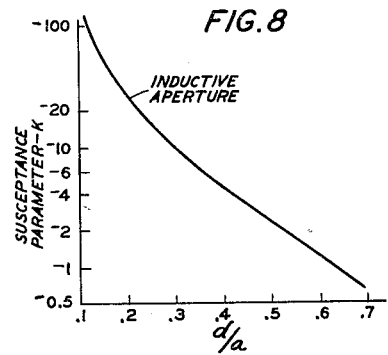

While approximate formulas are available for the susceptance of each of these three types of obstacles it is necessary in practice to use correction factors for certain quantities such as variations in thickness of the transverse strips 21 and 28 in Figs. 13 and 14, so that for purposes of the present disclosure there are included in the drawing experimentally determined relationships for the most generally used types of inductive obstacles illustrated in Figs. 12 and 13, these relationships being given in the graphs shown in Figs. 7 and 8, respectively. These relationships were obtained with rectangular guides of inside dimensions 0.872 inch by 1.872 inches in a frequency range around 4,000 megacycles.

The curve of Fig. 7 gives the value of the parameter K for the cylindrical metal post of diameter $d'$ centrally located in a rectangular wave guide of width $a$, parallel to the electric vector E of the electromagnetic waves within the guide. Fig. 12 shows such an inductive post 19 positioned, however, off center instead of at the center of a wave guide 20. The susceptance of a post such as 19 decreases as the post is moved off center. This feature is attractive when it is desired to make all the posts in a filter from stock of a given diameter.

The curve of Fig. 8 gives the value of the parameter K for the inductive obstacle shown in Fig. 13 comprising a transverse partition 21, having a thickness of 0.050 inch, with a centrally located rectangular aperture of width $d$ extending completely across the rectangular wave guide 20 in a direction parallel to the electric vector E.

The normalized susceptance B may be calculated from the parameter K, the wavelength $\lambda_g$ in the guide, and the width $a$ of the guide from the relationship.

$$B=K\frac{\lambda_g}{2a} \quad (16)$$

As an illustration of the design procedure, the following example is given. It is the objective of this design to obtain a maximally-flat wave guide filter having a pass band symmetrically centered at a frequency $f_0$ of 4050 megacycles and having less than 0.64 decibel standing wave ratio in the pass band of $f_0 \pm 10$ megacycles and at least 28 decibels standing wave ratio outside of the band defined by $f_0 \pm 30$ megacycles. The rectangular wave guide size is to be 0.872 inch x 1.872 inches. Since the characteristic is to be symmetrical and maximally-flat, the requirements on either side of the resonant frequency may be used to obtain the selectivity of the total filter and the number of elements that are needed. In this example the high frequency side will be considered.

Figure 5:
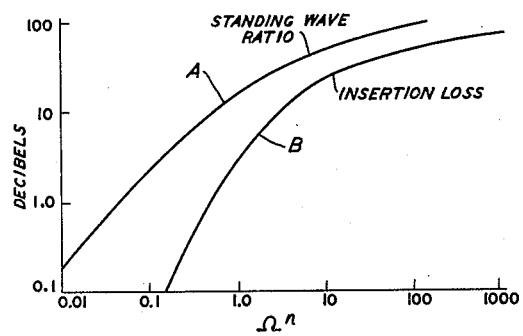
Figs. 5, 6, 7 and 8 show curves useful in designing a filter according to the invention.

The standing wave ratio SWR of a maximally-flat filter is given by $$\Omega^n=\frac{SWR-1}{2\sqrt{SWR}} \quad (17)$$

and this ratio in decibels is plotted against $\Omega^n$ as curve A in Fig. 5.

The insertion loss for this type of filter can be expressed in terms of the total selectivity $Q_T$ by $$\text{Loss function}=1+\left[Q_T\left(\frac{f}{f_0}-\frac{f_0}{f}\right)\right]^{2n} \quad (18)$$

where $$Q_T=\frac{1}{\dfrac{f_c}{f_0}-\dfrac{f_0}{f_c}} \quad (19)$$

Calling the bracketed term in Equation 18 $\Omega$ the insertion loss is given by $$\text{Loss function}=1+\Omega^{2n} \quad (20)$$

The loss in decibels is plotted against $\Omega^n$ as curve B in Fig. 5.

In the illustrative design, let $f_1=f_0+10$ megacycles where the standing wave ratio is to be 0.64 decibel or less and let $f_2=f_0+30$ megacycles where the standing wave ratio is to be at least 28 decibels. From these two frequencies the two frequency parameters $\Omega_1$ and $\Omega_2$ are obtained from Equation 19.

$$\Omega_1=Q_T\left(\frac{f_1}{f_0}-\frac{f_0}{f_1}\right)=Q_T\left(\frac{4060}{4050}-\frac{4050}{4060}\right)$$

$$\Omega_1=4.932(10)^{-3}Q_T \quad (21)$$

$$\Omega_2=Q_T\left(\frac{4080}{4050}-\frac{4050}{4080}\right)$$

$$\Omega_2=14.76(10)^{-3}Q_T \quad (22)$$

From the original specification, and from Equation 17 (plotted as curve A in Fig. 5) the two values are obtained:

$$\Omega_1{}^n = 0.0371 \quad (23)$$

$$\Omega_2{}^n = 2.41 \quad (24)$$

Thus, $$\left(\frac{\Omega_2}{\Omega_1}\right)^n = \left(\frac{14.76 Q_T}{4.932 Q_T}\right)^n = \frac{2.41}{0.0371} = 64.82 \quad (25)$$

from which $n=3.8$, which is the least number of branches that will meet the requirements. The next higher integer, 4, is then established as the number of branches. This filter will then take the general configuration shown in Fig. 4, where the first cavity is formed by the two obstacles $jB_1$ and the length of line $S_1$ and the second cavity is formed by the obstacles $jB_2$ and the length of line $S_2$. The third and fourth cavities are similar to the second and first cavities, respectively. The first and second cavities are connected by the line $S_{12}$, the second and third cavities by the line $S_{22}$ and the third and fourth cavities by $S_{12}$.

The selectivity of the total filter is obtained from combining Equation 23 and Equation 21 thus:

$$[(4.932)(10)^{-3} Q_T]^n = 0.0371 \quad (26)$$

Solving for $Q_T$ $$Q_T = 89 \quad (27)$$

Knowing the selectivity of the total filter, the selectivities of the four cavities are determined by Equation 1, thus:

$$Q_1 = Q_4 = 89 \sin \frac{\pi}{8} = 34.1 \quad (28)$$

$$Q_2 = Q_3 = 89 \sin \frac{3\pi}{8} = 82.2 \quad (29)$$

These selectivities are based upon the frequency. The selectivities based upon wavelengths are less by the factor $$\left(\frac{\lambda_a}{\lambda_g}\right)^2$$

as pointed out above. Since the susceptances of the obstacles which form the cavities are given as a function of the selectivity in terms of the wavelength (Equation 11) and plotted thus in Fig. 6, the latter selectivities are the desired ones and are from Equations 28 and 29 when the above correction factor is applied.

$$Q_{g1} = 34.1 \left(\frac{\lambda_a}{\lambda_g}\right)^2 = 13.43 \quad (30)$$

$$Q_{g2} = 82.2 \left(\frac{\lambda_a}{\lambda_g}\right)^2 = 32.36 \quad (31)$$

where $$\left(\frac{\lambda_a}{\lambda_g}\right)^2 = 1 - \left(\frac{\lambda_a}{2a}\right)^2 = 0.3946$$

since in this case $\lambda_a = 2.913$ inches and $$2a = 3.744 \text{ inches.}$$

Since these cavities are to be connected by means of $\tfrac{3}{4}\lambda$ lines, whose selectivity corresponds to $$Q_s = \frac{3\pi}{8} = 1.18$$

the cavities are designed to have $Q_g$'s that are:

$$Q_{g1} = 13.43 - 1.18 = 12.25$$

$$Q_{g2} = 32.36 - 2(1.18) = 30.0$$

If, as one example, the cavities are to be formed with inductive obstacles as illustrated in Fig. 12 or 13, the susceptances to obtain the above selectivities are obtained from Equation 11 or from curve L of Fig. 6. This gives $$B_1 = -4.08$$
$$B_2 = -6.36$$

If these susceptances are to be obtained with round cylindrical posts centered in the wave guide, the data plotted in Fig. 7 can be used to obtain the required post diameter with the aid of Equation 16.

Putting in the values of $\lambda_g = 4.638$ inches and $2a = (1.872)(2) = 3.744$ inches we have, from Equation 16, $$K = B\left(\frac{3.744}{4.638}\right) = 0.8076 B$$

and, for $B = -4.08$, $K = -3.3$ and from Fig. 7

$$\frac{d'_1}{a} = 0.06$$

whence $d'_1 = .1125$ inch.

For $B = -6.36$, $K = -5.15$ and from Fig. 7

$$\frac{d'_2}{a} = .096$$

and, therefore, $d'_2 = 0.180$ inch.

The lengths of the cavities are determined by the relationship (Equation 10)

$$\tan \frac{2\pi l}{\lambda_{g0}} = \frac{2}{B}$$

which gives for $S_1$, setting $B_1 = -4.08$, $$\frac{S_1}{\lambda_g} = \frac{\text{arc tan } (-.4901)}{360°}$$

$$S_1 = \lambda_g \left(\frac{153.9}{360}\right) = 1.98 \text{ inches}$$

and for $S_2$, setting $B_2 = -6.36$, $$S_2 = \lambda_g \left(\frac{162.6}{360}\right) = 2.09 \text{ inches}$$

The connecting lengths $S_{12}$ and $S_{22}$ are determined from the relation (Equation 15):

$$S_{12} = \frac{l_1 + l_2}{2} - \frac{\lambda_g}{4} + m\frac{\lambda_g}{2}$$

which, with $m = 1$, reduces to $$S_{12} = \frac{l_1 + l_2}{2} + \frac{\lambda_g}{4}$$

from wihch $$S_{12} = \frac{1.98 + 2.09}{2} + \frac{4.638}{4} = 3.194 \text{ inches}$$

$$S_{22} = 2.09 + \frac{4.638}{4} = 3.249 \text{ inches}$$

Figure 9:
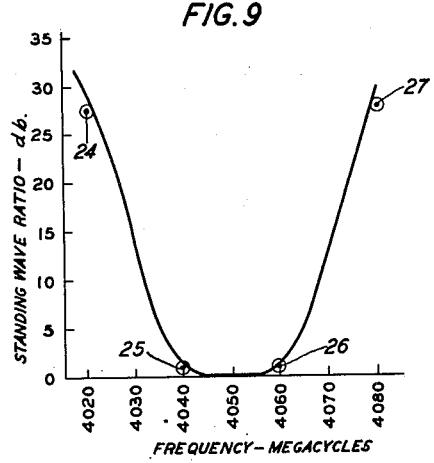
Fig. 9 shows a filter characteristic obtained with a filter constructed in accordance with the invention.
Figure 11:
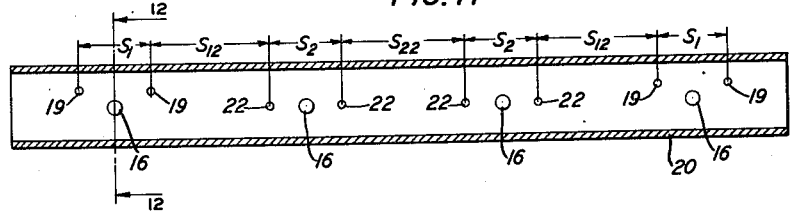
Fig. 11 is a longitudinal sectional view of another four-branch filter in accordance with the invention in which the susceptances are furnished by inductive posts.

These calculated dimensions were used to construct the filter shown in Fig. 11 except that all of the eight posts 19, 22 were located on the center line. Each of the four cavities was tuned separately to the resonant frequency by means of a capacitive screw 16 located in the middle of each cavity. The resulting transmission characteristic was centered two megacycles higher than $f_0$. Retuning the cavities to $f_0 - 2$ megacycles and assembling them again, the characteristic shown in Fig. 9 was obtained experimentally. The points 24, 25, 26 and 27 for the original design objective are shown circled and it is seen that they agree fairly closely with the measured characteristic.

If the susceptances of the inductive posts 19 and 22 had been controlled by moving them off center, instead of by changing the diameter, the filter would take the configuration illustrated in Fig. 11. Here all of the posts are the same diameter and the posts 19 for the two end cavities are moved far enough off center, as shown in Figs. 11 and 12, to obtain the correct susceptance, $B_1 = -4.08$.

Figure 10:
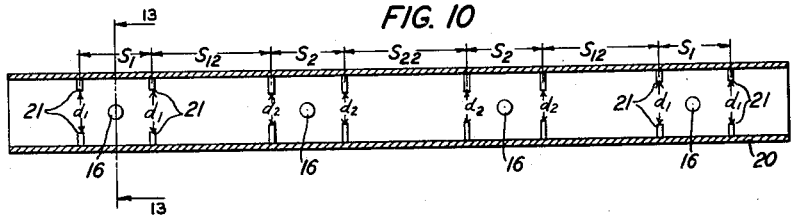
Fig. 10 is a longitudinal sectional view of a four-branch filter in accordance with the invention employing inductive irises.

If the obstacles had been made up of plane inductive irises such as 21 illustrated in Fig. 13, the four-branch filter would have had the configuration shown in Fig. 10. The lengths $S_1$, $S_{12}$, $S_2$ and $S_{22}$ would be the same as found for Fig. 11, and the iris openings could have been determined as outlined before, by use of Figs. 6 and 8 and Equation 16 to obtain the values of B, K, $d_1$ and $d_2$.

Had the four-branch filter been designed around capacitive obstacles, as illustrated in Fig. 14, the susceptances necessary to obtain the required selectivities could be determined as before from Equation 11 or curve C of Fig. 6. The susceptance would be controlled by the iris opening $x$, and the spacings of the elements would be determined by Equations 10 and 15. The capacitive obstacle shown in Fig. 14 comprises a transverse partition 28 with a centrally located rectangular aperture of width $x$ extending completely across the rectangular wave guide 20 in a direction perpendicular to the electric vector E.

While the design procedure has been followed through for the case of a four-branch filter incidental to illustrating the way in which a particular set of requirements could be met, the same kind of procedure can be followed to obtain filter designs of other numbers of required branches. This method of filter design has been successfully used to build filters whose specifications required the employment of from one to fifteen resonant cavities, and the longer of these is not to be taken as in any sense a limiting case.

The invention is not to be construed as limited to the specific types of construction shown herein for illustration nor to the details, dimensions or numerical magnitudes given but the scope of the invention is defined in the claims.

What is claimed is:

1. A filter for transmitting a band of electromagnetic waves comprising a wave guide and more than two pairs of substantially equal susceptive admittances positioned within said guide, each of said pairs of admittances being spaced to define a chamber resonant at approximately the mid-band frequency, the respective band widths passed by said chambers being approximately equal to the factor $$\sin \frac{2r-1}{2n}\pi$$

where $r$ denotes the order of the chamber counting from one end of the filter and $n$ is the total number of chambers, and adjacent chambers being spaced a distance approximately equal to the average spacing of the pairs of admittances defining said adjacent chambers, Minus $\frac{\lambda}{4}$ and plus $\frac{m\lambda}{2}$ where $\lambda$ is the wavelength in said guide at said mid-band frequency and $m$ is any integer including zero.

2. A filter in accordance with claim 1 in which said admittances are inductive.

3. A filter in accordance with claim 1 in which said admittances are capacitive.

4. A filter in accordance with claim 1 in which said admittances are constituted by irises.

5. A filter in accordance with claim 1 in which said admittances are constituted by transverse partitions having apertures therein.

6. A filter in accordance with claim 5 in which said apertures in said pairs of partitions increase in size from the center to both ends of said filter.

7. A filter in accordance with claim 5 in which said apertures extend substantially all the way across said guide in a direction parallel to the electric vector of said waves.

8. A filter in accordance with claim 5 in which said apertures extend substantially all the way across said guide in a direction perpendicular to the electric vector of said waves.

9. A filter in accordance with claim 1 in which said admittances are constituted by inductive posts extending all the way across said guide.

10. A filter in accordance with claim 9 in which all of said posts are of substantially equal cross-section and different pairs of said posts are positioned at different distances from the longitudinal center line of said guide.

11. A filter in accordance with claim 10 in which the pairs of posts defining the end chambers of the filter are located farther from said center line than are the intermediate posts.

12. A filter in accordance with claim 1 in which the susceptances of said pairs of admittances decrease from the center to both ends of said filter.

13. A filter in accordance with claim 1 which includes means for tuning said chambers.

14. A filter in accordance with claim 13 in which said means comprise capacitive plugs in a wall of said guide.

15. A filter in accordance with claim 14 in which said plugs are parallel to the electric vector of said waves.

16. A microwave filter comprising more than two resonant chambers tuned approximately to the mid-band frequency and interposed sections of wave guide connecting said chambers in tandem, the respective band widths passed by said chambers increasing progressively from the center to the ends of the filter to provide a maximally-flat transmission band for the filter.

17. A microwave filter comprising more than two resonant chambers tuned approximately to the mid-band frequency and interposed sections of wave guide connecting said chambers in tandem, the respective band widths passed by said chambers being approximately proportional to the factor $$\sin \frac{2r-1}{2n}\pi$$

where $r$ denotes the order of the chamber counting from one end of the filter and $n$ is the total number of chambers.

18. A filter in accordance with claim 17 in which adjacent chambers are spaced a distance approximately equal to the average length of said adjacent chambers, Minus $\frac{\lambda}{4}$ and plus $\frac{m\lambda}{2}$ where $\lambda$ is the wavelength in said guide at said mid-band frequency and $m$ is any integer including zero.

19. A filter for transmitting a band of electromagnetic waves comprising a wave guide and four pairs of substantially equal susceptive admittances positioned within said guide, each of said pairs of admittances being spaced to define a chamber resonant at approximately the mid-band frequency, the end chambers having equal band widths and each of the other chambers having a band width approximately equal to that of said end chambers multiplied by the factor $$\frac{\sin\frac{\pi}{8}}{\sin\frac{3\pi}{8}}$$

20. A filter in accordance with claim 19 in which adjacent chambers are spaced a distance approximately equal to the average spacing of the pairs of admittances defining said adjacent chambers, $$\text{Minus }\frac{\lambda}{4}\text{ and plus }\frac{m\lambda}{2}$$

where $\lambda$ is the wavelength in said guide at said mid-band frequency and $m$ is any integer including zero.

21. A wave guide filter comprising more than two resonant cavities spaced apart along a wave guide by a distance approximately equal to an odd multiple, including unity, of quarter wavelengths at the resonant frequency and all having the same resonant frequency, said cavities increasing in bandwidth from the center of the filter toward each end to provide a maximally-flat transmission band characteristic.

22. A filter in accordance with claim 21 in which the spacing between said cavities is adjusted to compensate for the excess phase shift of said cavities.

23. A filter in accordance with claim 16 in which said interposed sections of wave guide are adjusted in length to compensate for the excess phase shift of said chambers.

24. A filter in accordance with claim 17 in which said interposed sections of wave guide are adjusted in length to compensate for the excess phase shift of said chambers.

WILLIAM W. MUMFORD.

REFERENCES CITED

The following references are of record in the file of this patent:

UNITED STATES PATENTS

| Number | Name | Date |
|---|---|---|
| 1,849,656 | Bennett | Mar. 15, 1932 |
| 2,270,416 | Cork | Jan. 20, 1942 |
| 2,432,093 | Fox | Dec. 9, 1947 |
| 2,438,119 | Fox | Mar. 23, 1948 |

FOREIGN PATENTS

| Number | Country | Date |
|---|---|---|
| 374,767 | Italy | Sept. 7, 1939 |

OTHER REFERENCES

Fano and Lawson: "Microwave filters using quarter-wave couplings," I. R. E. Proceedings, vol. 35, No. 11, November 1947, pages 1318–1323. 178–44.2A.

Pritchard: "Quarter wave coupled wave-guide filters," Journal of Applied Physics, October 1947, pages 862–872.